US012313091B2

(12) United States Patent
Billich

(10) Patent No.: US 12,313,091 B2
(45) Date of Patent: May 27, 2025

(54) ARRANGEMENT FOR OPERATING A HYDRAULIC CONSUMER

(71) Applicant: DEERE & COMPANY, Moline, IL (US)

(72) Inventor: Manuel Billich, Dischingen (DE)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 18/357,262

(22) Filed: Jul. 24, 2023

(65) Prior Publication Data

US 2024/0026908 A1 Jan. 25, 2024

(30) Foreign Application Priority Data

Jul. 25, 2022 (DE) ......................... 102022118535.4

(51) Int. Cl.
*F15B 11/16* (2006.01)

(52) U.S. Cl.
CPC .......... *F15B 11/163* (2013.01); *F15B 11/165* (2013.01); *F15B 2211/20546* (2013.01);
(Continued)

(58) Field of Classification Search
CPC .................. F15B 11/163; F15B 11/165; F15B 2211/20546; F15B 2211/20553; F15B 2211/30535; F15B 2211/3111; F15B 2211/3127; F15B 2211/3144; F15B 2211/327; F15B 2211/6309;
(Continued)

(56) References Cited

U.S. PATENT DOCUMENTS 5,079,919 A * 1/1992 Nakamura .............. F16H 61/47 60/426
5,129,230 A * 7/1992 Izumi .................... E02F 9/2235 60/452
5,177,964 A * 1/1993 Tanaka .................. F16H 61/425 60/368
5,186,000 A * 2/1993 Hirata ................... E02F 9/2225 91/518
5,267,440 A * 12/1993 Nakamura ............ E02F 9/2235 91/518

(Continued)

FOREIGN PATENT DOCUMENTS

| | | | |
|---|---|---|---|
| DE | 3644737 | A1 | 7/1988 |
| EP | 3597941 | A1 | 1/2020 |
| WO | WO 9210684 | A1 | 6/1992 |

OTHER PUBLICATIONS

European Search Report issued in Application No. 23183852.5, dated Nov. 27, 2023, 8 pages.

*Primary Examiner* — Dustin T Nguyen

(57) ABSTRACT

An arrangement for operating a hydraulic consumer including a hydraulic control valve having a main slide valve defining a hydraulic volume flow in the direction of hydraulic connections provided for operation of the hydraulic consumer, a pressure compensation valve and an orifice, the pressure compensation valve controlled on the basis of a pressure difference that drops at the orifice when the volume flow passes through, such that the pressure compensation valve adopts an at least partially closing control position when the hydraulic pressure upstream of the orifice in the direction of the volume flow is greater than downstream of the orifice, including a restoring spring force of a spring element preloading the pressure compensation valve into a fully open position, and a sensor arrangement sensing the pressure difference and transmitting a pressure difference value derived therefrom to a control unit evaluating the pressure difference value.

18 Claims, 3 Drawing Sheets

(52) U.S. Cl.
CPC ............... *F15B 2211/20553* (2013.01); *F15B 2211/30535* (2013.01); *F15B 2211/3111* (2013.01); *F15B 2211/3127* (2013.01); *F15B 2211/3144* (2013.01); *F15B 2211/327* (2013.01); *F15B 2211/6309* (2013.01); *F15B 2211/6313* (2013.01); *F15B 2211/65* (2013.01); *F15B 2211/6651* (2013.01); *F15B 2211/6652* (2013.01); *F15B 2211/6654* (2013.01); *F15B 2211/6655* (2013.01); *F15B 2211/85* (2013.01); *F15B 2211/86* (2013.01); *F15B 2211/88* (2013.01)

(58) Field of Classification Search
CPC .......... F15B 2211/6313; F15B 2211/65; F15B 2211/6651; F15B 2211/6652; F15B 2211/6654; F15B 2211/6655; F15B 2211/85; F15B 2211/86; F15B 2211/88
See application file for complete search history.

(56) References Cited

U.S. PATENT DOCUMENTS

| | | | | |
|---|---|---|---|---|
| 5,297,381 | A * | 3/1994 | Eich | F15B 11/163 91/518 |
| 5,307,631 | A * | 5/1994 | Tatsumi | E02F 9/2296 60/452 |
| 11,001,245 | B2 * | 5/2021 | Dinkel | B60T 13/161 |
| 11,326,592 | B2 | 5/2022 | Remmelmann et al. | |

* cited by examiner

ARRANGEMENT FOR OPERATING A HYDRAULIC CONSUMER

CROSS-REFERENCE TO RELATED APPLICATIONS

This application claims priority to German Patent Application No. 102022118535.4, filed Jul. 25, 2022, which is hereby incorporated by reference.

FIELD OF THE DISCLOSURE

The disclosure relates to an arrangement for operating a hydraulic consumer.

BACKGROUND

Typically, hydraulic control valves are used in agricultural tractors for the operation of hydraulic consumers which are comprised by an attachment attached to the agricultural tractor and serve there to carry out various work functions. The hydraulic consumers are generally hydraulic rotational drives and/or linear actuators.

SUMMARY

Usually, a plurality of hydraulic control valves, which are frequently also known as "control devices" or "selective control valves—SCVs" in this connection, are combined into a control valve block located in the rear or front region of the agricultural tractor. Each of the hydraulic control valves leads on the connection side into a pair of hydraulic bushings, wherein a first hydraulic bushing forms a feed and a second hydraulic bushing forms a return for hydraulic fluid. The hydraulic bushings serve to receive hydraulic couplers of complementary design, via which a releasable plug connection can be established for operating a respectively associated hydraulic consumer.

To put the hydraulic consumer into operation, the valve position of the main slide valve can be defined as desired by an operator via an operator terminal provided in the agricultural tractor. In this case, the pressure compensation valve comprised by the hydraulic control valve ensures that a constant volume flow that corresponds to the valve position of the main slide valve and is independent of supply pressure fluctuations is established.

During operation of the hydraulic consumer, undesired states can occur. Two different operating situations A and B can be distinguished from one another here:

Operating Situation A

First of all, it is possible that the volume flow demanded as a result of the respective valve position of the main slide valve is not achievable because of a simultaneously existing increased supply requirement of other hydraulic consumers which are supplied with hydraulic fluid from the same hydraulic source. This leads to an undersupply of the hydraulic consumers as a whole and thus possibly to corresponding restrictions in the configuration of respectively associated operating and work functions.

Operating Situation B

In addition, there are hydraulic consumers in which no (appreciable) volume flow flows during operation as a matter of principle, resulting ultimately in a hydraulic pressure build-up, which has the result that the system pressure built up by an associated hydraulic source adopts a maximum value which, in the case of a hydraulic system provided in an agricultural tractor, can typically be up to 190 bar. This is the case in particular for hydraulic consumers in the form of hydraulic linear actuators, in which, as a matter of principle, a volume flow flows only during the adjustment operation until an associated end stop is reached.

In light of this, the problem addressed by the present disclosure is to develop an arrangement of the type mentioned at the beginning such that it allows inefficient operating states of a hydraulic supply of a hydraulic consumer to be identified.

This problem is solved by an arrangement for operating a hydraulic consumer having the features of one or more of the following embodiments.

The arrangement for operating a hydraulic consumer comprises a hydraulic control valve having a main slide valve, a pressure compensation valve and an orifice, wherein, via the main slide valve, a hydraulic volume flow in the direction of hydraulic connections provided for operation of the hydraulic consumer is able to be defined, wherein the pressure compensation valve is controlled on the basis of a pressure difference that drops at the orifice when the volume flow passes through, such that the pressure compensation valve adopts an at least partially closing control position when the hydraulic pressure upstream of the orifice in the direction of the volume flow is greater than downstream of the orifice, including a restoring spring force of a spring element preloading the pressure compensation valve into a fully open position. Here, a sensor arrangement senses the pressure difference and transmits a pressure difference value derived therefrom to a control unit, wherein the control unit, by evaluating the pressure difference value, extrapolates a mismatch of the hydraulic supply on the part of the hydraulic control valve when the pressure difference is smaller than a control value given by the restoring spring force.

Such a state arises when, with the main slide valve open, either no (appreciable) volume flow flows through the orifice in the direction of the hydraulic consumer (operating situation A) or the volume flow does not achieve the volume flow to be expected as a result of the respective valve position (operating situation B). In both cases, the pressure drop across the orifice and thus the pressure difference sensed via the sensor arrangement becomes negligibly small, such that the pressure difference forms a clear indicator, which is easy to evaluate, for the occurrence of inefficient operating states of the hydraulic supply of the hydraulic consumer in question.

The restoring spring force generated via the spring element is of such a size that the pressure compensation valve reliably adopts its fully open position in the unpressurized state. The control value that thus arises for the differential pressure that has to be achieved for switching the pressure compensation valve from its fully open position into its (at least partially closing) control position lies in the range from 5 to 15 bar here.

The arrangement according to the disclosure is in particular a constituent of a superordinate hydraulic system of an agricultural tractor and serves there, inter alia, for the operation of an attachment that is able to be attached to the agricultural tractor, more specifically a hydraulic consumer provided thereby for carrying out a corresponding work function.

Advantageous developments of the arrangement according to the disclosure can be found in the following embodiments.

In some embodiments, the sensor arrangement comprises a first pressure sensor and a second pressure sensor, wherein at least one of the two pressure sensors is integrated in a space-saving manner into a common valve housing of the hydraulic control valve. The sensor signals generated by the pressure sensors can in this case be picked up at an electrical plug connector that is accessible from the outside on the valve housing.

In principle, it is also conceivable to integrate both pressure sensors in the valve housing. In the case of a plurality of hydraulic control valves combined in particular in a control valve block, it is possible to avoid unnecessary redundancy, however, when the pressure sensor provided for sensing the hydraulic pressure upstream of the orifice is assigned to a common feed line used for the hydraulic supply.

The knowledge of the hydraulic supply mismatch that arises as a result of the operating situations A and B, respectively, can be used to take suitable countermeasures. To this end, the main slide valve can be closed by the control unit, through actuation of an electric actuating device, irrespective of a hydraulic demand at the hydraulic control valve that results in particular from the input at the operator terminal, until the pressure difference sensed by sensor means is greater than the control value given by the restoring spring force or until the main slide valve finally adopts a fully closing valve position.

On the other hand, the control unit can open the main slide valve for test purposes following a predefined waiting time by actuating the electric actuating device on the basis of a hydraulic demand at the hydraulic control valve that results in particular from an input at an operator terminal. If the pressure difference turns out again to be smaller than the control value given by the restoring spring force of the spring element of the pressure compensation valve, it is obvious that the already identified mismatch of the hydraulic supply is persisting, and the main slide valve is again closed by the control unit, through actuation of the electric actuating device, until the pressure difference sensed by sensor means is again greater than the control value given by the restoring spring force or until the main slide valve finally adopts a fully closing valve position.

Usually, the volume flow is generated via a load-controlled variable displacement pump, such that it is possible, when a pivoting angle of the variable displacement pump that indicates the achievement of a maximum displacement volume and thus an imminent undersupply of the hydraulic consumer is detected by sensor means, for the control unit to increase the delivery rate by acting in a pump drive. In such a case, it is conceivable for the control unit to increase the delivery rate by acting in the pump drive until the pressure difference sensed by sensor means is greater than the control value given by the restoring spring force of the spring element of the pressure compensation valve.

Conversely, the control unit can reduce the delivery rate of the variable displacement pump back to a level provided for normal operation as soon it identifies, via sensor means, a change in pivoting angle that indicates a reduction in the displacement volume. This ensures that an increase in the delivery rate resulting in increased energy consumption takes place only for as long as it is actually required.

The pump drive is for example a separate motor, which can be drive-connected to the variable displacement pump via an interposed transmission, wherein its rotational speed is adaptable in order to change the delivery rate via a control device that communicates with the control unit.

The above and other features will become apparent from the following detailed description and accompanying drawings.

BRIEF DESCRIPTION OF THE DRAWINGS

The arrangement according to the disclosure for operating a hydraulic consumer for an attachment attached to an agricultural tractor will be described in more detail in the following text with reference to the drawings. Here, identical reference signs refer to corresponding components or components which are of comparable function. In the drawings.

DETAILED DESCRIPTION

The embodiments or implementations disclosed in the above drawings and the following detailed description are not intended to be exhaustive or to limit the present disclosure to these embodiments or implementations.

Figure 1:
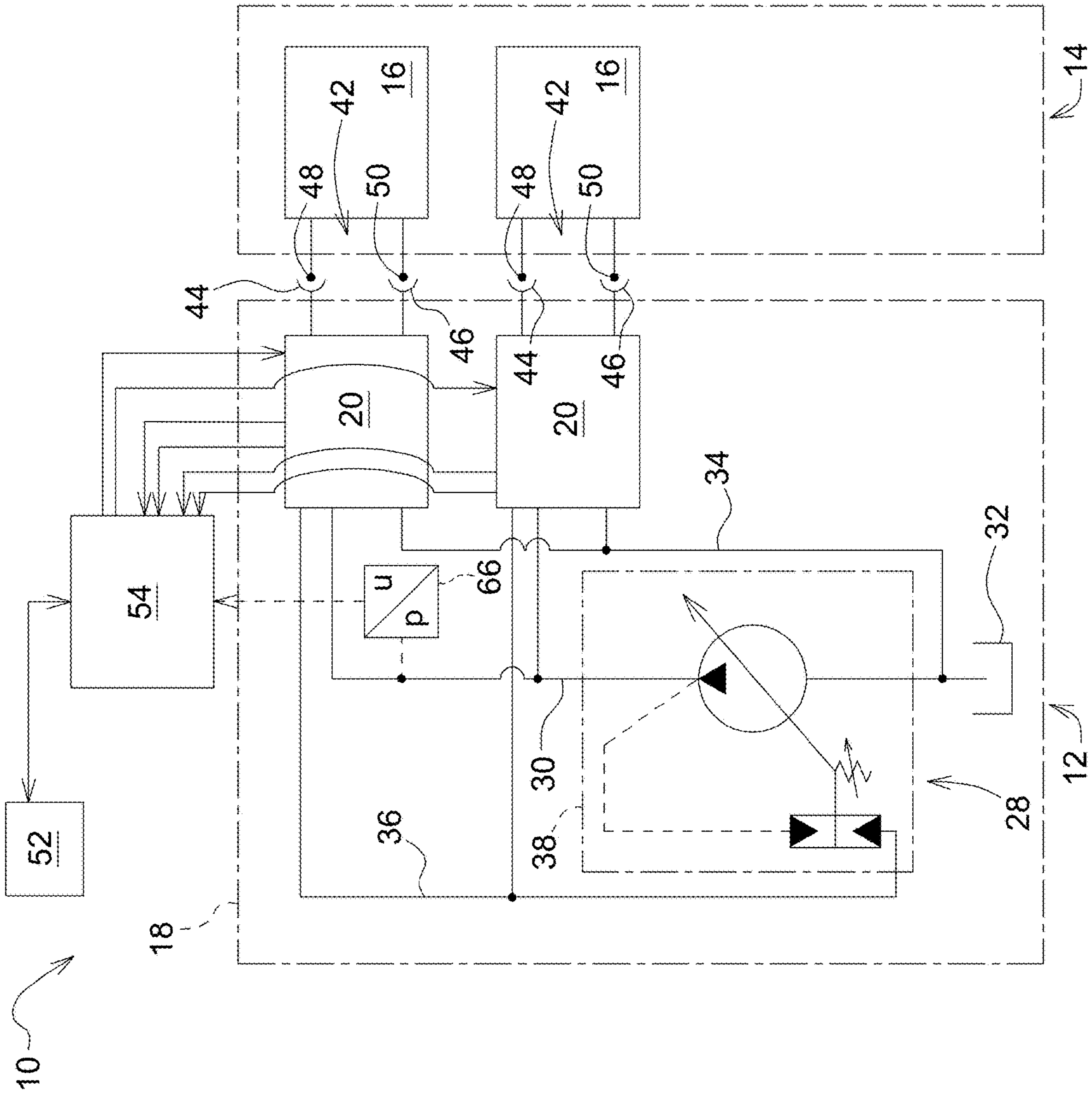
FIG. 1 shows a schematically illustrated example embodiment of the arrangement according to the disclosure for operating a hydraulic consumer for an agricultural tractor.

FIG. 1 shows a schematically illustrated example embodiment of the arrangement 10 according to the disclosure for operating an attachment 14 attached to an agricultural tractor 12, more specifically a hydraulic consumer 16 provided thereby for carrying out a corresponding work function.

Figure 3:
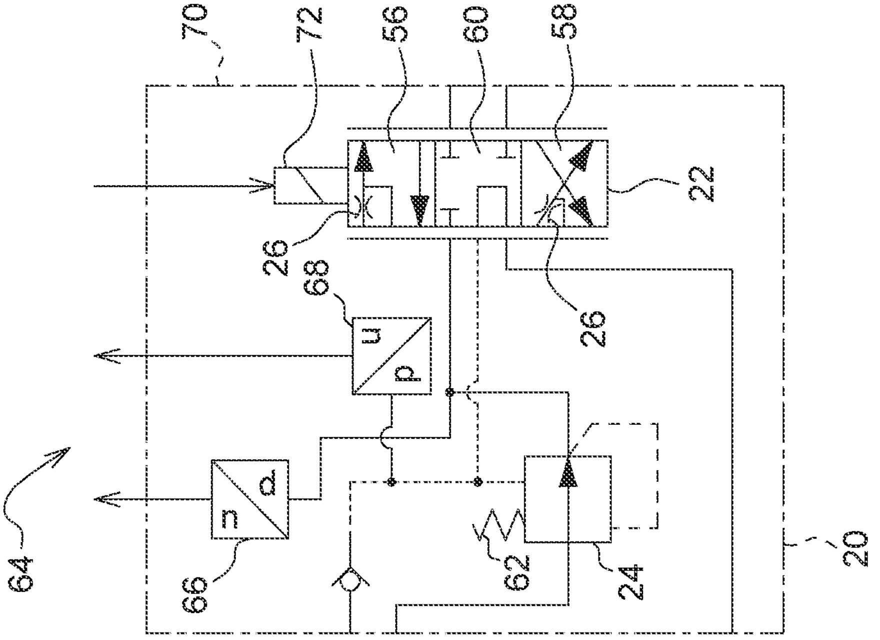
FIG. 3 shows a second configuration of a hydraulic control valve comprised by the arrangement according to the disclosure according to FIG. 1.
Figure 2:
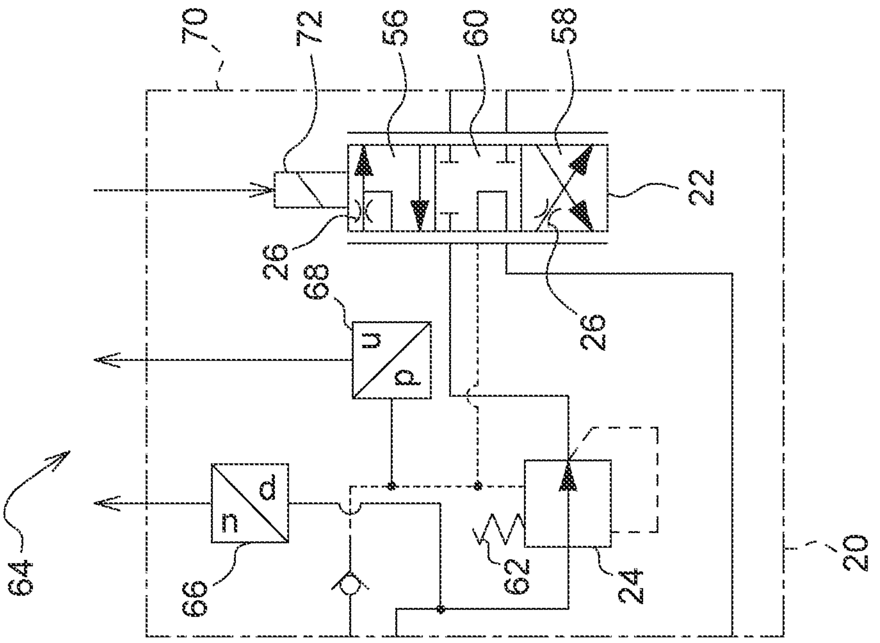
FIG. 2 shows a first configuration of a hydraulic control valve comprised by the arrangement according to the disclosure according to FIG. 1.

In some embodiments, the arrangement 10 is part of a superordinate hydraulic system 18 of the agricultural tractor 12 and comprises a hydraulic control circuit 20 which is reproduced in detail in FIG. 2 and FIG. 3 and has, for its part, a main slide valve 22, a pressure compensation valve 24 and an orifice 26.

According to the usual design, the hydraulic system 18 has a supply line 30 fed by a hydraulic high-pressure source 28, a return line 34 that leads into a hydraulic reservoir 32, and a load-indicating line 36, wherein the hydraulic high-pressure source 28, which is in the form of a load-controlled variable displacement pump 38, generates a volume flow that can be adapted on the basis of pressure feedback on the load-indicating line 36.

According to the example, a plurality of hydraulic control circuits 20 of identical design are combined by being connected in parallel to form a control valve block located in the rear or front region of the agricultural tractor 12. Each of the hydraulic control circuits 20 leads on the connection side into a pair 42 of hydraulic bushings, wherein a first hydraulic bushing 44 forms a feed and a second hydraulic bushing 46 forms a return for hydraulic fluid. The hydraulic bushings 44, 46 serve to receive hydraulic couplers 48, 50 of complementary design, via which a releasable plug connection can be established for operating the respectively associated hydraulic consumer 16.

To put the hydraulic consumer 16 into operation, the valve position of the main slide valve 22 is defined as desired by an operator via an operator terminal 52 which is provided in the agricultural tractor 12 and, for its part, communicates with a microprocessor-controlled control unit 54 (e.g., a controller including a processor and memory) for electrically actuating the main slide valve 22. In this case, the pressure compensation valve 24 comprised by the hydraulic control circuit 20 ensures that a constant volume flow that corresponds to the valve position of the main slide valve 22 and is independent of supply pressure fluctuations is established in the direction of the respective hydraulic consumer 16.

As is apparent from FIG. 2 and FIG. 3, the hydraulic control circuit 20 has three valve positions in the present case:

A first and a second open valve position 56, 58 corresponding to the two possible directions of flow of the volume flow, and a closed valve position 60. In addition, there may be a further valve position (not shown) for realizing a so-called floating position, in which the two hydraulic bushings 44, 46 communicate freely with one another.

The pressure compensation valve 24 is actuated on the basis of a pressure difference that drops at the orifice 26 when the volume flow passes through, such that the pressure compensation valve 24 adopts an at least partially closing control position when the hydraulic pressure upstream of the orifice 26 in the direction of the volume flow is greater than that downstream of the orifice 26, including a restoring spring force of a spring element 62 preloading the pressure compensation valve 24 into a fully open position.

In the control position, the pressure compensation valve 24 attempts to keep the pressure difference across the orifice 26 approximately constant, wherein the pressure difference is determined essentially by the preload built up via the spring element 62.

Here, the restoring spring force generated via the spring element 62 is of such a size that the pressure compensation valve 24 reliably adopts its fully open position in the unpressurized state. The control value that thus arises for the differential pressure that has to be achieved for switching the pressure compensation valve 24 from its fully open position into its (at least partially closing) control position lies in the range from 5 to 15 bar here.

During operation of the hydraulic consumer 16, undesired states can occur. Two different operating situations A and B can be distinguished from one another here:

Operating Situation A

First of all, it is possible that the volume flow demanded as a result of the respective valve position of the main slide valve 22 is not achievable because of a simultaneously existing increased supply requirement of other hydraulic consumers which are likewise supplied with hydraulic fluid from the load-controlled variable displacement pump 38. This leads to an undersupply of the hydraulic consumers as a whole and thus possibly to corresponding restrictions in the configuration of respectively associated operating and work functions.

Operating Situation B

In addition, there are hydraulic consumers 16 in which no (appreciable) volume flow flows during operation as a matter of principle, resulting ultimately in a hydraulic pressure build-up, which has the result that the system pressure built up by the load-controlled variable displacement pump 38 adopts a maximum value which can be up to 190 bar in the present case. This is the case in particular for hydraulic consumers 16 in the form of hydraulic linear actuators, in which, as a matter of principle, a volume flow flows only during the adjustment operation until an associated end stop is reached.

As is also apparent from FIG. 1, a sensor arrangement 64 senses the pressure difference that arises at the orifice 26, in order to transmit a pressure difference value derived therefrom to the control unit 54. Here, the control unit 54, by evaluating the pressure difference value, extrapolates a mismatch of the hydraulic supply on the part of the hydraulic control circuit 20 when the pressure difference is smaller than the control value given by the restoring spring force.

Such a state arises when, with the main slide valve 22 open, either no (appreciable) volume flow flows through the orifice plate 26 in the direction of the hydraulic consumer 16 (operating situation A) or the volume flow does not achieve the volume flow to be expected as a result of the respective valve position (operating situation B). In both cases, the pressure drop across the orifice plate 26 and thus the pressure difference sensed via the sensor arrangement 64 becomes negligibly small, such that the pressure difference forms a clear indicator, which is easy to evaluate, for the occurrence of inefficient operating states of the hydraulic supply of the hydraulic consumer 16 in question.

The sensor arrangement 64 comprises a first pressure sensor 66 and a second pressure sensor 68, wherein the first pressure sensor 66 is provided to sense the hydraulic pressure upstream of the orifice 26 and the second pressure sensor 68 is provided to sense the hydraulic pressure downstream of the orifice 26 (in each case in relation to the direction of the volume flow). The two pressure sensors 66, 68 are, in the case of the configurations of the hydraulic control circuit 20 that are depicted in FIG. 2 and FIG. 3, integrated in a space-saving manner into a common valve housing 70. The sensor signals generated by the pressure sensors 66, 68 are in this case picked up at an electrical plug connector (not shown) that is accessible from the outside on the valve housing 70 and are transmitted to the control unit 54. In this case, the two configurations differ in terms of the positioning of the first pressure sensor 66. Thus, the first pressure sensor 66 serves to sense the pressure conditions either on the inlet side or on the outlet side of the pressure compensation valve 24.

According to the two above configurations, each of the hydraulic control circuits 20 is equipped with a separate sensor arrangement 64 having two pressure sensors 66, 68. In the case of a plurality of hydraulic control circuits 20 combined in a control valve block, it is possible to avoid unnecessary redundancy, however, when the first pressure sensor 66 provided for sensing the hydraulic pressure upstream of the orifice 26 is assigned to a common feed line used for the hydraulic supply, in this case to the supply line 30. This option is indicated by way of dashed lines in FIG. 1.

The knowledge of the hydraulic supply mismatch that arises as a result of the operating situations A and B, respectively, is used to take suitable countermeasures. To this end, the main slide valve 22 is closed by the control unit 54, through actuation of an electric actuating device 72, irrespective of a hydraulic demand at the hydraulic control circuit 20 that results in particular from the input at the operator terminal 52, until the pressure difference sensed by sensor means is greater than the control value given by the restoring spring force or until the main slide valve 22 finally adopts its fully closing valve position 60.

In addition, provision is made for the control unit 54 to open the main slide valve 22 for test purposes following a predefined waiting time by actuating the electric actuating device 72 on the basis of a hydraulic demand at the hydraulic control circuit 20. If the pressure difference turns out again to be smaller than the control value given by the restoring spring force of the spring element 62 of the pressure compensation valve 24, it is obvious that the already identified mismatch of the hydraulic supply is persisting, and the main slide valve 22 is again closed by the control unit 54, through actuation of an electric actuating device 72, until the pressure difference sensed by sensor means is again greater than the control value given by the restoring spring force or until the main slide valve 22 finally adopts its fully closing valve position 60.

Figure 4:
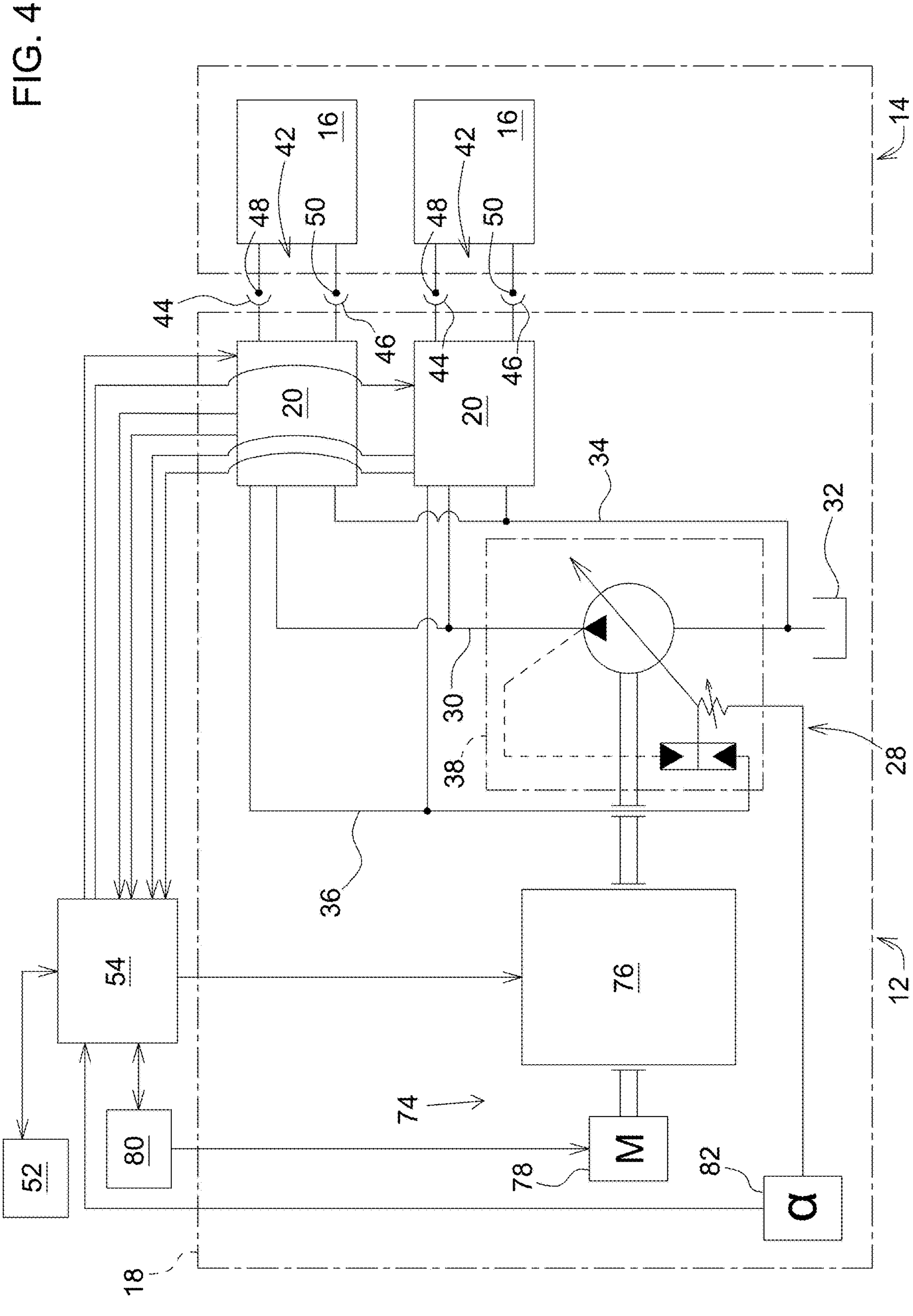
FIG. 4 shows a modification of the arrangement according to the disclosure depicted in FIG. 1.

FIG. 4 shows a modification of the arrangement 10 depicted in FIG. 1, in which a pump drive 74 is provided, which is a separate motor 78 which is drive-connected to the variable displacement pump 38 via an interposed transmission 76 and the rotational speed of which is adaptable to change the delivery rate via a control device 80 communicating with the control unit 54.

In this case, when a pivoting angle α of the variable displacement pump 38 that indicates the achievement of a maximum displacement volume and thus an imminent undersupply of the hydraulic consumer 16 is detected by sensor means, the control unit 54 increases the delivery rate by acting in the pump drive 74. For this purpose, the control unit 54 increases the delivery rate until the pressure difference sensed by the two pressure sensors 66, 68 is greater than the control value given by the restoring spring force of the spring element 62 of the pressure compensation valve 24.

Conversely, the control unit 54 reduces the delivery rate of the variable displacement pump 38 back to a level provided for normal operation as soon it identifies, via sensor means, a change in pivoting angle Aa that indicates a reduction in the displacement volume.

The sensing of the pivoting angle α and the change in pivoting angle Aa by sensor means takes place via a pivoting-angle sensor 82 which is assigned to the variable displacement pump 38 and the sensor signals from which are supplied to the control unit 54 for evaluation.

The terminology used herein is for the purpose of describing example embodiments or implementations and is not intended to be limiting of the disclosure. As used herein, the singular forms "a," "an," and "the" are intended to include the plural forms as well, unless the context clearly indicates otherwise. It will be further understood that the any use of the terms "has," "includes," "comprises," or the like, in this specification, identifies the presence of stated features, integers, steps, operations, elements, and/or components, but does not preclude the presence or addition of one or more other features, integers, steps, operations, elements, components, and/or groups thereof.

Those having ordinary skill in the art will recognize that terms such as "above," "below," "upward," "downward," "top," "bottom," etc., are used descriptively for the figures, and do not represent limitations on the scope of the present disclosure, as defined by the appended claims. Furthermore, the teachings may be described herein in terms of functional and/or logical block components or various processing steps, which may include any number of hardware, software, and/or firmware components configured to perform the specified functions.

Terms of degree, such as "generally," "substantially," or "approximately" are understood by those having ordinary skill in the art to refer to reasonable ranges outside of a given value or orientation, for example, general tolerances or positional relationships associated with manufacturing, assembly, and use of the described embodiments or implementations.

As used herein, "e.g.," is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

While the above describes example embodiments or implementations of the present disclosure, these descriptions should not be viewed in a restrictive or limiting sense. Rather, there are several variations and modifications which may be made without departing from the scope of the appended claims.

What is claimed is:

1. An arrangement for operating a hydraulic consumer, comprising:

a hydraulic control valve having a main slide valve defining a hydraulic volume flow in the direction of hydraulic connections provided for operation of the hydraulic consumer;

a pressure compensation valve and an orifice, the pressure compensation valve controlled on the basis of a pressure difference that drops at the orifice when the volume flow passes through, such that the pressure compensation valve adopts an at least partially closing control position when the hydraulic pressure upstream of the orifice in the direction of the volume flow is greater than downstream of the orifice, including a restoring spring force of a spring element preloading the pressure compensation valve into a fully open position; and a sensor arrangement sensing the pressure difference and transmitting a pressure difference value derived therefrom to a control unit evaluating the pressure difference value and determining a mismatch of the hydraulic supply on the part of the hydraulic control valve is occurring when the pressure difference is smaller than a control value given by the restoring spring force;

wherein the main slide valve is closed by the control unit, through actuation of an electric actuating device, irrespective of a hydraulic demand at the hydraulic control valve that results in particular from an input at an operator terminal, until the pressure difference sensed via the sensor arrangement is greater than the control value given by the restoring spring force or until the main slide valve adopts a fully closing valve position.

2. The arrangement of claim 1, wherein the sensor arrangement comprises a first pressure sensor and a second pressure sensor, wherein at least one of the two pressure sensors is integrated in a common valve housing of the hydraulic control valve.

3. The arrangement of claim 2, wherein the first pressure sensor provided to sense the hydraulic pressure upstream of the orifice is assigned to a common feed line, used for the hydraulic supply, of a plurality of hydraulic control valves.

4. The arrangement of claim 1, wherein the control unit opens the main slide valve for test purposes following a predefined waiting time by actuating the electric actuating device based on a hydraulic demand at the hydraulic control valve that results in particular from an input at an operator terminal.

5. The arrangement of claim 1, wherein the volume flow is generated via a load-controlled variable displacement pump, wherein, when a pivoting angle of the variable displacement pump that indicates the achievement of a maximum displacement volume is detected via a pivoting angle sensor, the control unit increases the delivery rate by acting in a pump drive.

6. The arrangement of claim 5, wherein the control unit increases the delivery rate by acting in the pump drive until the pressure difference sensed via the sensor arrangement is greater than the control value given by the restoring spring force of the spring element of the pressure compensation valve.

7. The arrangement of claim 6, wherein the control unit reduces the delivery rate of the variable displacement pump to a level provided for normal operation as soon as it identifies, via the pivoting angle sensor, a change in pivoting angle that indicates a reduction in the displacement volume.

8. An agricultural tractor including an arrangement for operating a hydraulic consumer, comprising:

a hydraulic control valve having a main slide valve defining a hydraulic volume flow in the direction of hydraulic connections provided for operation of the hydraulic consumer;

a pressure compensation valve and an orifice, the pressure compensation valve controlled on the basis of a pressure difference that drops at the orifice when the volume flow passes through, such that the pressure compensation valve adopts an at least partially closing control position when the hydraulic pressure upstream of the orifice in the direction of the volume flow is greater than downstream of the orifice, including a restoring spring force of a spring element preloading the pressure compensation valve into a fully open position; and a sensor arrangement sensing the pressure difference and transmitting a pressure difference value derived therefrom to a control unit evaluating the pressure difference value and determining a mismatch of the hydraulic supply on the part of the hydraulic control valve is occurring when the pressure difference is smaller than a control value given by the restoring spring force;

wherein the main slide valve is closed by the control unit, through actuation of an electric actuating device, irrespective of a hydraulic demand at the hydraulic control valve that results in particular from an input at an operator terminal, until the pressure difference sensed via the sensor arrangement is greater than the control value given by the restoring spring force or until the main slide valve adopts a fully closing valve position.

9. The agricultural tractor of claim 8, wherein the sensor arrangement comprises a first pressure sensor and a second pressure sensor, wherein at least one of the two pressure sensors is integrated in a common valve housing of the hydraulic control valve.

10. The agricultural tractor of claim 9, wherein the first pressure sensor provided to sense the hydraulic pressure upstream of the orifice is assigned to a common feed line, used for the hydraulic supply, of a plurality of hydraulic control valves.

11. The agricultural tractor of claim 8, wherein the control unit opens the main slide valve for test purposes following a predefined waiting time by actuating the electric actuating device based on a hydraulic demand at the hydraulic control valve that results in particular from an input at an operator terminal.

12. The agricultural tractor of claim 8, wherein the volume flow is generated via a load-controlled variable displacement pump, wherein, when a pivoting angle of the variable displacement pump that indicates the achievement of a maximum displacement volume is detected via a pivoting angle sensor, the control unit increases the delivery rate by acting in a pump drive.

13. The agricultural tractor of claim 12, wherein the control unit increases the delivery rate by acting in the pump drive until the pressure difference sensed via the sensor arrangement is greater than the control value given by the restoring spring force of the spring element of the pressure compensation valve.

14. The agricultural tractor of claim 13, wherein the control unit reduces the delivery rate of the variable displacement pump to a level provided for normal operation as soon as it identifies, via the pivoting angle sensor, a change in pivoting angle that indicates a reduction in the displacement volume.

15. An arrangement for operating a hydraulic consumer, comprising:

a hydraulic control valve having a main slide valve defining a hydraulic volume flow in the direction of hydraulic connections provided for operation of the hydraulic consumer;

a pressure compensation valve and an orifice, the pressure compensation valve controlled on the basis of a pressure difference that drops at the orifice when the volume flow passes through, such that the pressure compensation valve adopts an at least partially closing control position when the hydraulic pressure upstream of the orifice in the direction of the volume flow is greater than downstream of the orifice, including a restoring spring force of a spring element preloading the pressure compensation valve into a fully open position; and a sensor arrangement sensing the pressure difference and transmitting a pressure difference value derived therefrom to a control unit evaluating the pressure difference value and determining a mismatch of the hydraulic supply on the part of the hydraulic control valve is occurring when the pressure difference is smaller than a control value given by the restoring spring force;

wherein the volume flow is generated via a load-controlled variable displacement pump, wherein, when a pivoting angle of the variable displacement pump that indicates the achievement of a maximum displacement volume is detected via a pivoting angle sensor, the control unit increases the delivery rate by acting in a pump drive; and wherein the control unit increases the delivery rate by acting in the pump drive until the pressure difference sensed via the sensor arrangement is greater than the control value given by the restoring spring force of the spring element of the pressure compensation valve.

16. The arrangement of claim 15, wherein the control unit reduces the delivery rate of the variable displacement pump to a level provided for normal operation as soon as it identifies, via the pivoting angle sensor, a change in pivoting angle that indicates a reduction in the displacement volume.

17. An agricultural tractor including an arrangement for operating a hydraulic consumer, comprising:

a hydraulic control valve having a main slide valve defining a hydraulic volume flow in the direction of hydraulic connections provided for operation of the hydraulic consumer;

a pressure compensation valve and an orifice, the pressure compensation valve controlled on the basis of a pressure difference that drops at the orifice when the volume flow passes through, such that the pressure compensation valve adopts an at least partially closing control position when the hydraulic pressure upstream of the orifice in the direction of the volume flow is greater than downstream of the orifice, including a restoring spring force of a spring element preloading the pressure compensation valve into a fully open position; and a sensor arrangement sensing the pressure difference and transmitting a pressure difference value derived therefrom to a control unit evaluating the pressure difference value and determining a mismatch of the hydraulic supply on the part of the hydraulic control valve is occurring when the pressure difference is smaller than a control value given by the restoring spring force;

wherein the volume flow is generated via a load-controlled variable displacement pump, wherein, when a pivoting angle of the variable displacement pump that indicates the achievement of a maximum displacement volume is detected via a pivoting angle sensor, the control unit increases the delivery rate by acting in a pump drive; and wherein the control unit increases the delivery rate by acting in the pump drive until the pressure difference sensed via the sensor arrangement is greater than the control value given by the restoring spring force of the spring element of the pressure compensation valve.

18. The agricultural tractor of claim 17, wherein the control unit reduces the delivery rate of the variable displacement pump to a level provided for normal operation as soon as it identifies, via the pivoting angle sensor, a change in pivoting angle that indicates a reduction in the displacement volume.

* * * * *